United States Patent [19]

Doyle

[11] Patent Number: 4,833,560
[45] Date of Patent: May 23, 1989

[54] SELF-BIASED MAGNETORESISTIVE REPRODUCE HEAD

[75] Inventor: William D. Doyle, San Diego, Calif.

[73] Assignee: Eastman Kodak Company, Rochester, N.Y.

[21] Appl. No.: 66,797

[22] Filed: Jun. 26, 1987

[51] Int. Cl.$^4$ ............................ G11B 5/12; G11B 5/30
[52] U.S. Cl. .................................... 360/113; 360/125; 338/32 R
[58] Field of Search .............. 360/113, 125; 338/32 R

[56] References Cited

U.S. PATENT DOCUMENTS

| | | | |
|---|---|---|---|
| 3,864,751 | 2/1975 | Beaulieu et al. | 360/113 |
| 4,547,824 | 10/1985 | Best et al. | 360/113 |
| 4,639,806 | 1/1987 | Kira et al. | 360/113 |
| 4,652,945 | 3/1987 | Marchant | 360/113 X |

Primary Examiner—John H. Wolff
Attorney, Agent, or Firm—Daniel Robbins

[57] ABSTRACT

In a magnetoresistive reproduce head which is self-biased by a saturated soft adjacent layer magnetically coupled to the magnetoresistive element, the induced anisotropy fields of the magnetoresistive element and the soft adjacent layer are made to lie in the direction of the bias field at the magnetoresistive element rather than perpendicular to the bias field. These induced anistropy fields partially counteract demagnetizing fields which oppose the bias field, and thereby lower the current in the magnetoresistive element required to saturate the soft adjacent layer in biasing the magnetoresistive element. The lowered current reduces the Joule heating of the magnetoresistive element and attendantly results in improved head performance.

4 Claims, 6 Drawing Sheets

4,833,560

SELF-BIASED MAGNETORESISTIVE REPRODUCE HEAD

BACKGROUND OF THE INVENTION

1. Field of the Invention

This invention relates to a self-biased magnetoresistive (MR) reproduce head, and in particular to an MR head employing a magnetoresistive element and soft adjacent biasing layer (SAL) both having induced uniaxial anisotropy axes.

Figure 1:
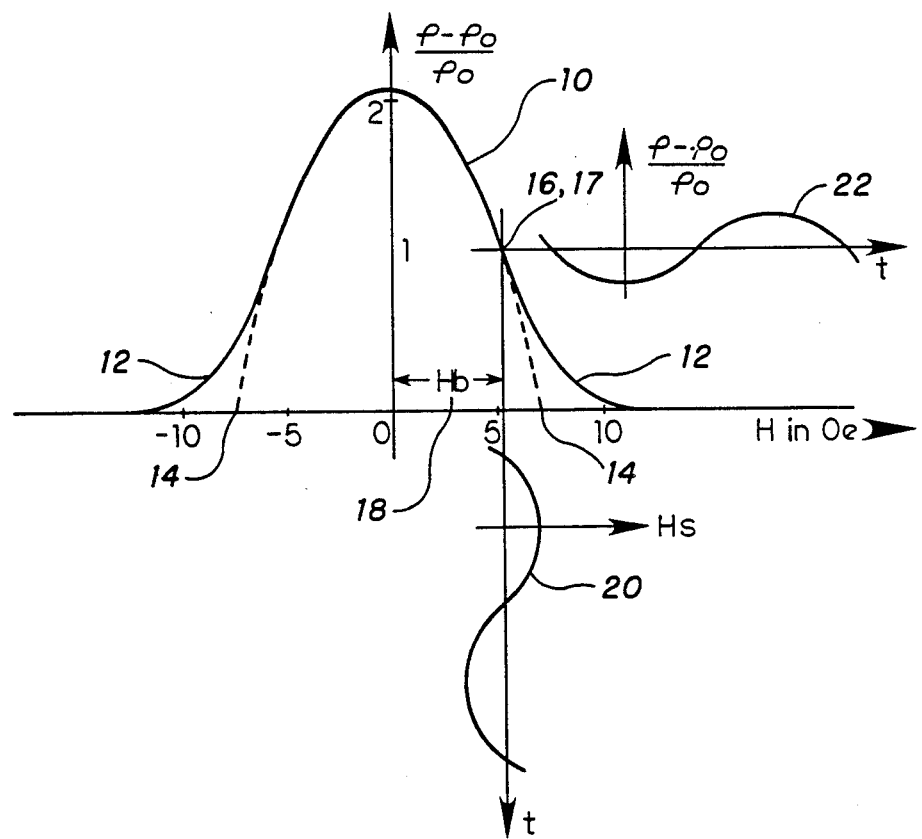
Figure 2:
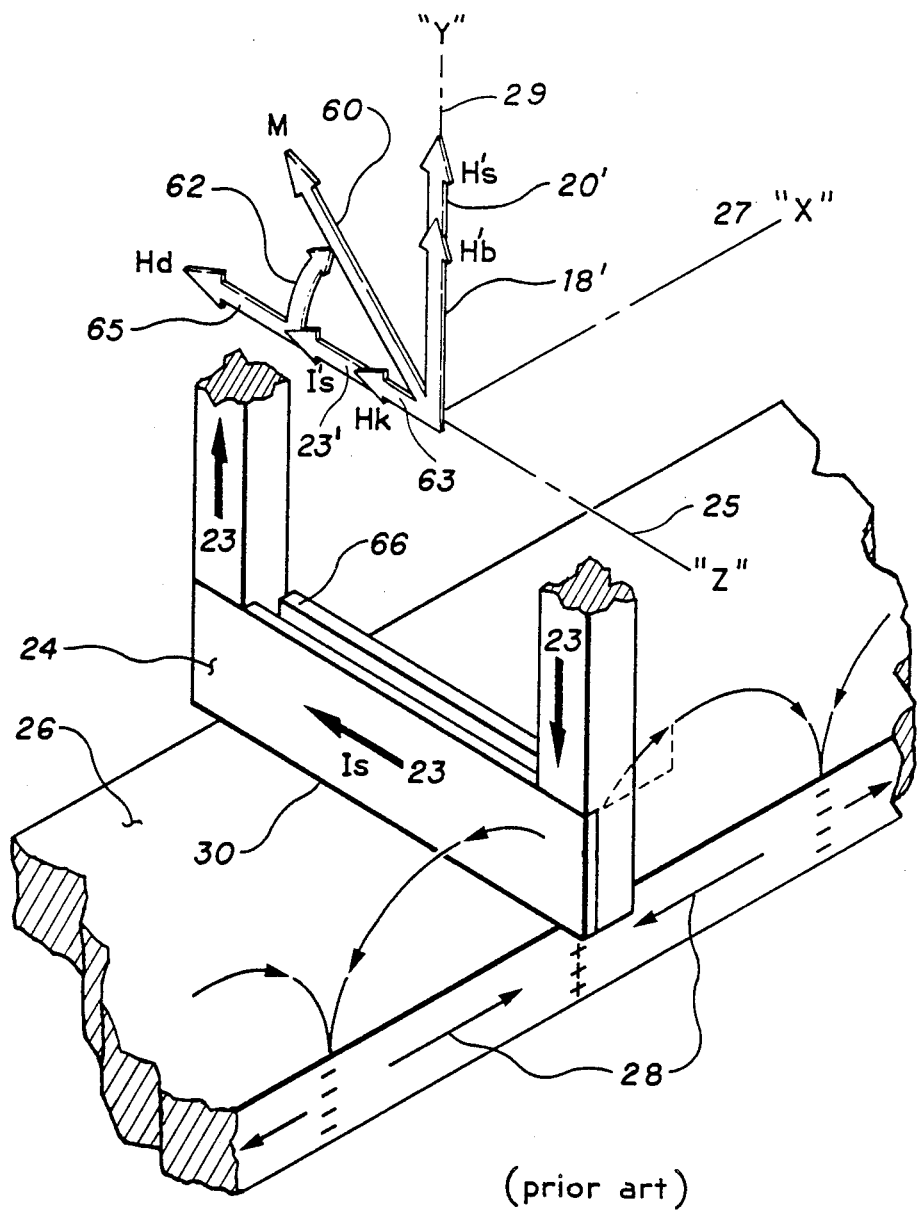
Figure 3:
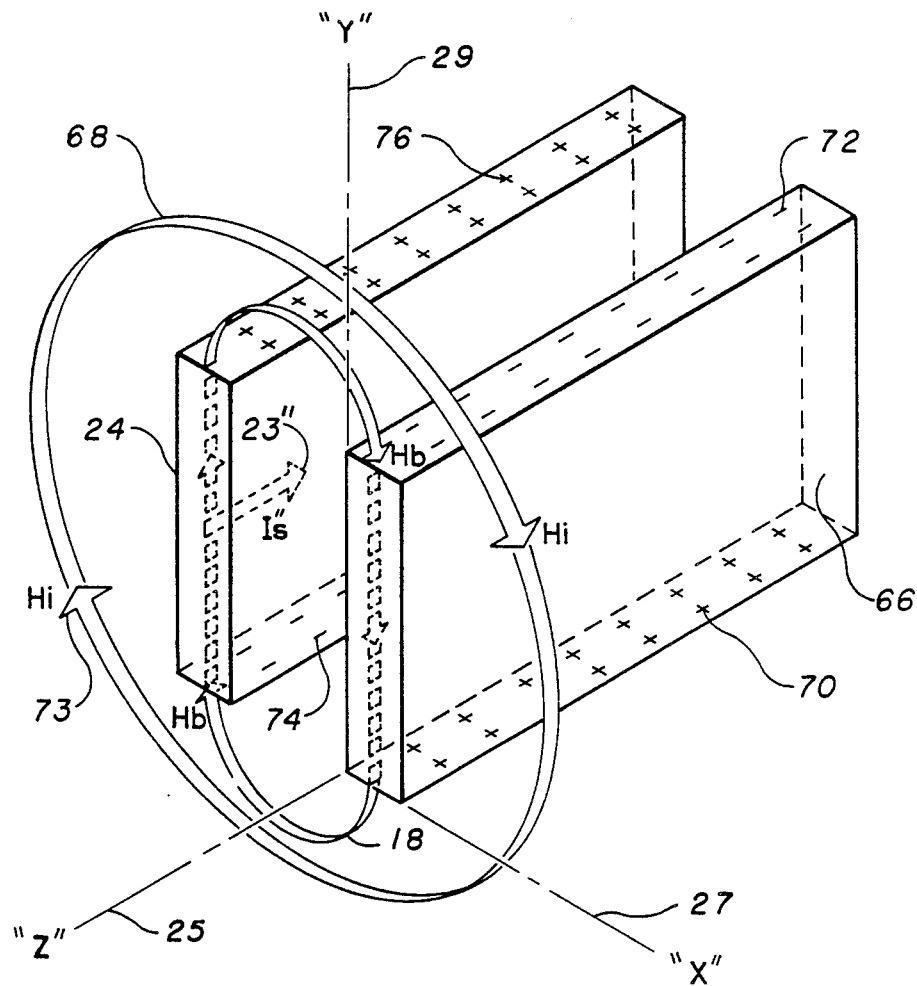
Figure 4:
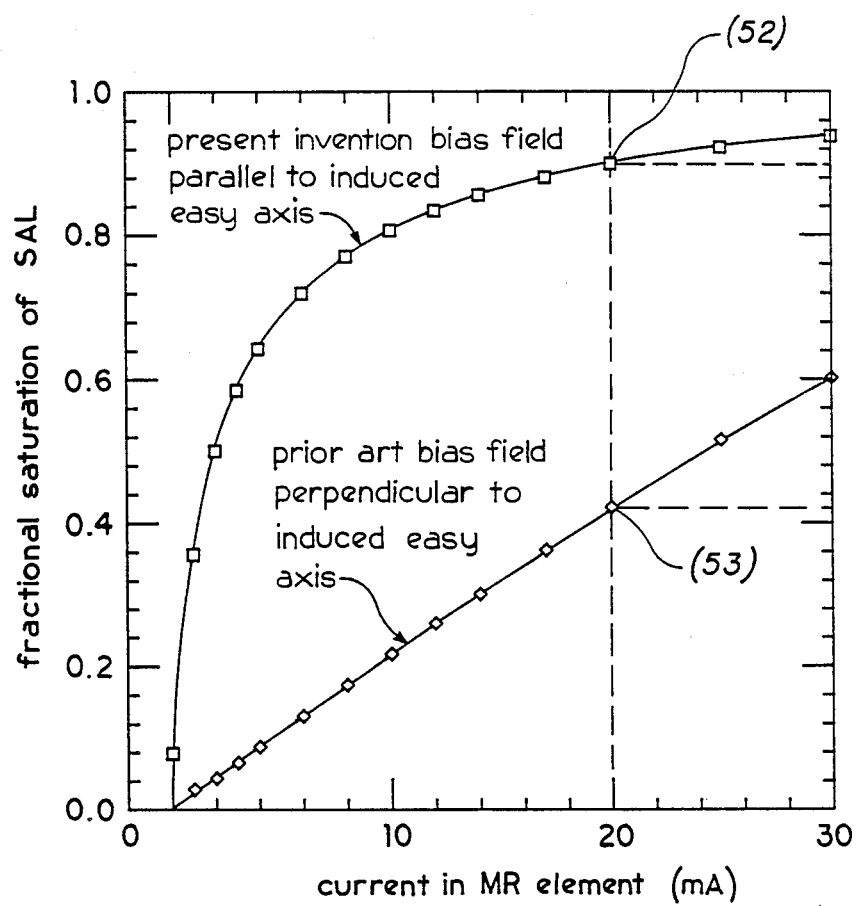
Figure 5:
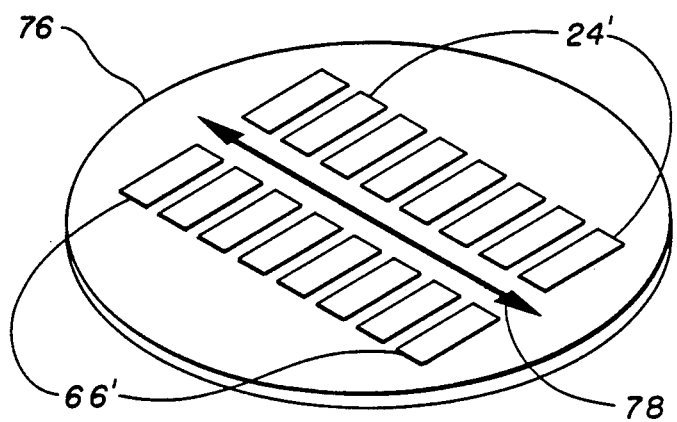
Figure 6:
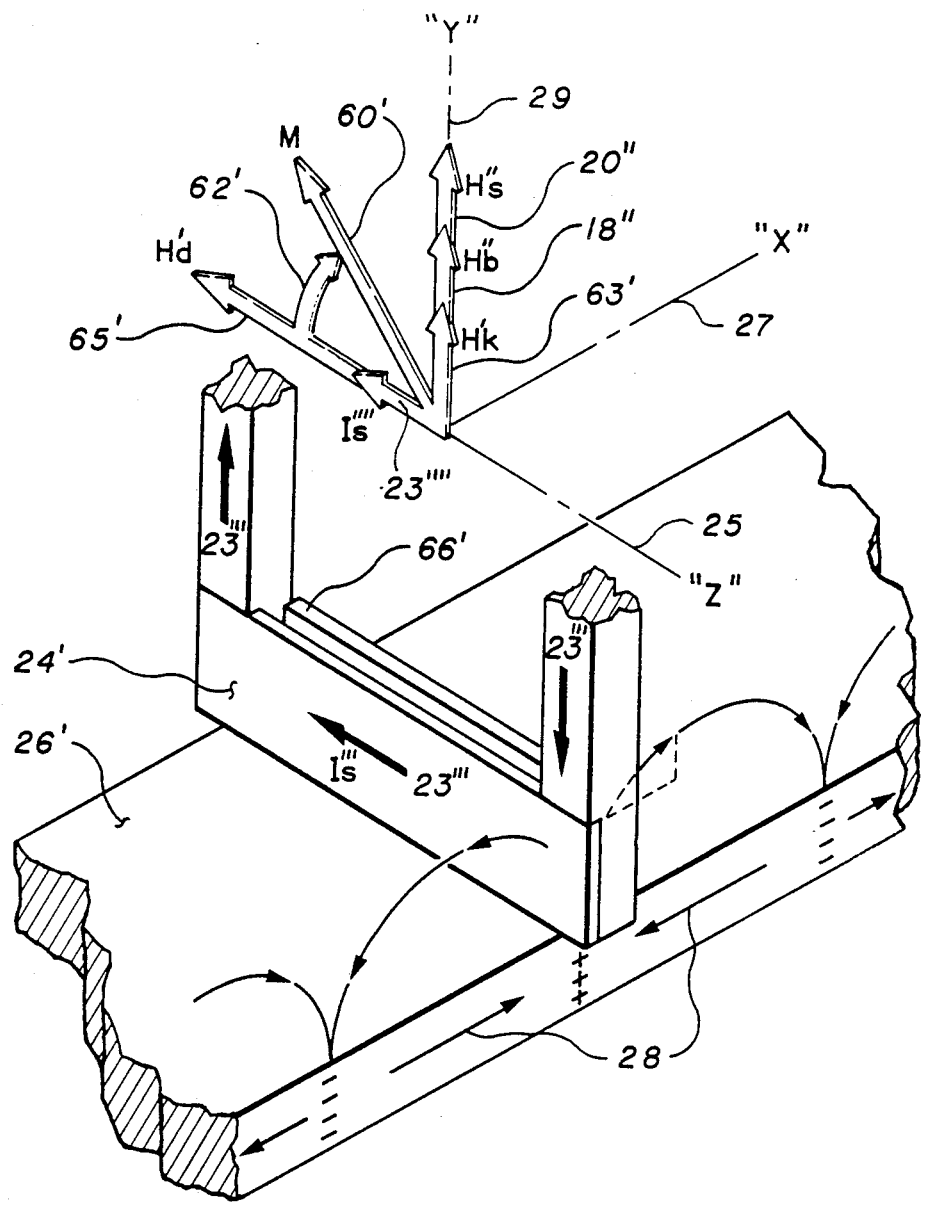

The invention, as well as the prior art, will be described with reference to the figures of which:

FIG. 1 is a graph of magnetoresistance as a function of applied magnetic field,

FIG. 2 is a perspective view of a prior art magnetoresistive head in contact with a section of magnetic tape, including a depiction of related vector quantities, FIG. 3 is a perspective drawing showing generation of the bias field at a magnetoresistive element by means of a soft adjacent layer known in the prior art, FIG. 4 depicts graphs of the fractional saturation of a soft adjacent layer as a function of current according to the prior art and according to the practice of the present invention, FIG. 5 is a drawing of thin magnetic films having a uniaxial induced anisotropy axis deposited on a substrate wafer and patterned into device geometry by means of conventional lithographic techniques, and FIG. 6 is a perspective drawing of a magnetoresistive head in contact with a section of magnetic tape in accordance with the present invention, including a depiction of related vector quantities.

2. Description Relative to the Prior Art

The MR reproduce head responds to a signal recorded on a magnetic medium through variation of resistance of a magnetoresistive element which intercepts the signal flux emanating from the medium. As is known in the art, the theoretical variation in resistance for a single domain film is a parabolic function of the magnetic field strength applied to the element. Referring to FIG. 1, the ordinate of curve 10 represents the fractional change of the resistance of a typical single domain NiFe permalloy thin film magnetoresistive element as a function of magnetic field strength, H. Because of demagnetizing fields in the layer, the curve 10 deviates in the regions 12 from the "simple" parabolic response represented by dotted segments 14.

It is usual in the art to set the operating point 17 of the magnetoresistive element to provide maximum output signal and minimum second harmonic distortion. This point occurs at the point of inflection 16 of the curve 10 in a uniform signal field. In practice, several factors cause the definition of the optimum point to be more complex, and it must generally be determined either theoretically or experimentally in a given application. A constant bias field Hb 18 applied to the magnetoresistive element establishes the operating point 17, and a varying input signal field Hs 20 applied about the operating point 17 results in an output resistance variation 22 which replicates the input signal Hs 20. The corresponding voltage drop resulting from a sense current 23 flowing through the MR element 24 (FIG. 2) provides a voltage output.

The mechanism of resistance variation in a magnetoresistive reproduce head may be further understood by referring to FIG. 2. A vertically oriented MR element 24 is located in close proximity to a magnetic medium 26, moving in the "X" direction 27, which carries a pre-recorded signal 28. ("Vertical orientation" of the element is a term of art signifying that a long edge 30 of the MR element 24, essentially in contact with the medium 26, is perpendicular to the "X" direction 27 of medium motion, and that the plane of the MR element 24 is perpendicular to the recorded surface of the medium 26. Typically the MR element 24 is located in the vertical plane, and the long edge 30 of the MR element 24 is horizontally oriented.) The vectors H's 20' and H'b 18' correspond to the fields Hs and Hb of FIG. 1. (In the drawings, different but related elements are designated by the same reference character, albeit that the associated elements are distinguished by the use of primes.)

It is known in the art that ferromagnetic elements may have an induced uniaxial preferred direction of magnetization. The term "induced anisotropy" describes this characteristic, and the most preferred direction lies along the 38 induced easy axis". In contrast, the least preferred direction lies along the "induced hard axis". In fabricating a thin film magnetic element, an induced uniaxial anisotropy may be imparted to the element by vacuum deposition of the film material onto an appropriate substrate in the presence of a magnetic field. In the resulting structure of the deposited element, the induced easy axis of the film will be parallel to the direction of the applied magnetic field. In the prior art, processing of the thin film element includes alignment of a photolithographic mask on the substrate so that the major geometric axis of the film is along the direction of the induced easy axis. An MR head having the induced easy axis in the direction of the major geometric axis of the MR element is described in U.S. Pat. No. 3,864,751 entitled "Induced Bias Magnetoresistive Read Transducer" issued in the names of Beaulieu et al., dated Feb. 4, 1975.

In addition to the induced anisotropy, a magnetic material is characterized by "shape anisotropy" which also affects the relative ease of magnetization as a function of direction. Shape anisotropy is dependent upon the geometry of the body being magnetized, and arises due to internal demagnetization fields which appear when a magnetic material is subjected to a magnetizing field. As is known in the art, magnetic poles develop on the surfaces of the magnetic body due to the magnetization of the body, and these poles are the source of the demagnetizing field which opposes the original magnetizing field. ("Physics of Magnetism", S. Chikazumi, John Wiley and Sons, Inc. New York, 1964, pp. 19–24) For a body having the shape of a thin rectangular film, (and ignoring the film thickness), the minor geometric axis of the film generally supports the strongest demagnetizing field, while the major geometric axis supports the weakest one. The direction along the major geometric axis, therefore, is the most readily magnetizable one, and by analogy with induced anisotropy, is designated as the "shape anisotropy easy axis". The minor geometric axis is, correspondingly, the "shape anisotropy hard axis".

With the above description in mind, and again referring to FIG. 2, it will be appreciated that for the MR head of the prior art illustrated, both the induced and shape anisotropy easy axes lie along the "Z" direction 25 of the MR element 24. In the absence of any perturbing fields the magnetization vector M 60, which characterizes the remanent magnetic field, will prefer to lie along the direction of the easy axes. However, the bias field H'b, represented by the vector 18', rotates the magnetization vector M 60 away from the easy axes direction 25 by the angle 62. An effective "anisotropy field", consisting in this case of the sum of the induced anisotropic field Hk 63 and the shape anisotropy field Hd 65, (which lie in the same direction), is postulated to account for the restoring torque tending to realign the magnetization M 60 with the easy axes direction 25. The magnetization vector M 60 assumes the equilibrium angle 62 under the opposing torques due to the bias field H'b 18' and the net effective anisotropy field, Hd (65)+Hk (63). Because the resistance variation of the MR element 24 is a function of the angle 62 between the magnetization vector 60 and the easy axes direction 25, the operating point 16 of FIG. 1 is established by the value of the angle 62 as set by the magnitudes of the bias field H'b 18' and the net effective anisotropy field Hd (65)+Hk (63).

In a self-biased MR head of the prior art, the bias is derived by means of a magnetically soft adjacent layer 66, of approximately the same size and shape as the MR element, placed in close proximity to the MR element 24. The soft adjacent layer 66 is a low coercivity magnetic thin film having its easy axis due to both induced anisotropy and shape anisotropy in the direction of its major geometric axis. The SAL 66 is located adjacent to the MR element 24, whose easy axis is also in the direction of its major geometric axis as previously described. The manner in which the bias is developed may be understood by referring to FIG. 3 which is a representation of the MR element 24 and SAL element 66 viewed along the "Z" direction 25 of FIG. 2. The origin of the bias field Hb 18 is the sense current 23 (FIG. 2) which flows along the major geometric axis direction of the MR element 24. In FIG. 3, for the direction of the current 23 shown, a magnetizing field Hi 68 is produced in the direction indicated by the arrow 73. The field Hi 68 induces positive magnetic poles 70 and negative magnetic poles 72 at or near the bottom and top surfaces of the SAL, and the external field resulting from these poles is the bias field Hb 18. In turn, the bias field Hb induces poles 74, 76 at or near the top and bottom surfaces of the MR element, and these poles as well as the poles 70, 72 of the SAL partially cancel the demagnetizing fields in both the MR element and the SAL element respectively. It will be recalled from the previous discussion of shape anisotropy, that in a film of the geometry under consideration, the minor geometric axis of the film is a harder axis to magnetize than the major geometric axis. It will be seen from FIG. 3 that the geometric axes of the MR element and SAL elements in the "Y" direction 29 are hard axes, and that the bias field Hb 18 does not lie in the direction of the net induced and shape anisotropy easy axes, which lie in the "Z" direction 25, but in a direction perpendicular to them. This configuration requires "fighting" both the induced anisotropy and shape anisotropy fields in establishing the optimum bias field Hb by means of the magnetizing field Hi.

Additionally, in establishing the bias field, it is advantageous to employ a large enough sense current to insure a magnetizing field capable of magnetically saturating the SAL. When the SAL is saturated, the resultant bias field is independent of the sense current magnitude.

The detrimental characteristics attendant to the self-biasing of an MR element by means of a saturated SAL as practiced in the prior art, i.e., a demagnetizing field opposing the establishment of the bias field Hb due to shape anisotropy, and the fact that the bias field is perpendicular to the direction of the induced easy axes of the MR and SAL elements, necessitates a substantial sense current flow in the MR thin film element to generate the required magnetizing field Hi. The MR element, whose thickness is on the order of only several hundred angstroms, is susceptible to overheating under these conditions. The Joule heating losses in the MR element due to the sense current flow required to provide adequate bias may sufficiently elevate the temperature of the MR element to either destroy the MR element or to cause deterioration in its performance.

SUMMARY OF THE INVENTION

To ameliorate the high level of sense current required to generate the bias of the prior art self-biased magnetoresistive reproduce head utilizing a saturated soft adjacent layer, the present invention teaches orienting the induced easy axes of both the MR and SAL elements in the direction along the minor geometric axes of the MR and SAL elements, which is also the direction of bias field. The sense current flowing in the direction of the major geometric axis of the MR element generates a magnetizing field at the SAL whose interaction with the SAL gives rise to the correctly oriented bias field. Because the induced easy axes of the MR and SAL elements are in the same direction as the bias field, the required level of sense current is only that necessary to overcome the demagnetizing field related shape anisotropy. The fractional magnetic saturation of the SAL as a function of sense current is shown in FIG. 4 for both the prior art case, where the induced easy axes are perpendicular to the direction of the bias field at the MR, and the case illustrative of the practice of the present invention, where they are parallel to it. The curves of FIG. 4 apply to an MR element 500 angstroms thick separated by 1000 angstroms from a parallel SAL, 300 angstroms thick. Both films have an induced anisotropy field Hk of 5 oersteds. From FIG. 4, it will be appreciated that a sense current of 20 ma. will essentially saturate the SAL (i.e., to 0.9 of full scale saturation) (52) when the MR and SAL induced easy axes are in the direction of the bias field, while the same current will only provide about 0.4 of full scale saturation (53) for the case where the easy induced axes are perpendicular to the bias field. By practice of the teaching of the present invention, an adequate sense current saturates the SAL and maintains an adequate bias field while circumventing the problem of excessive heating with attendant impairment of the MR element.

DESCRIPTION OF THE INVENTION

Referring to FIG. 5, a soft adjacent permalloy thin film layer, 300 angstroms thick, is deposited on a substrate wafer 76 with its induced easy axis in the direction 78 of an applied magnetic field. An insulating layer of silicon dioxide is then deposited over the soft adjacent layer. A permalloy thin film magnetoresistive layer, 500 angstroms thick, whose induced easy axis is also in the direction 78, is then deposited. Finally, a protective cover plate of silicon dioxide is deposited over the assembly. The wafer 76, which previously was lithographically patterned with the element outline, is then diced to provide an MR element 24' and a SAL element 66' "sandwich" whose major geometric axes are perpendicular to the direction 78 of the induced easy axis. The MR element 24' and the SAL element 66' sandwich is assembled into a magnetic head with the MR element 24' and the SAL element 66' vertically oriented as shown in FIG. 6. This head assembly is structurally similar as the prior art head illustrated in FIG. 2; however, the induced easy axes and the induced anisotropy field vectors H"k 63' of the MR element 24' and of the SAL layer 66' are now oriented vertically, i.e. in the direction of the bias vector H"b 18" rather than perpendicular to it.

Resultantly, there are two competing anisotropies perpendicular to each other both in the MR element and in the SAL element; the shape anisotropy represented by the shape anisotropy field vector H'd 65' lying along the major geometric axes, and the induced anisotropy represented by the induced anisotropy field vector H'k 63' lying along the minor geometric axes. Because the magnetization vector M 60' of the MR element tends to lie along the net easy axis in the absence of any perturbing field, the question is now addressed as to how the magnetization vector M 60' will, in fact, be aligned.

The above described situation is an example of "mixed anisotropies", (Cullity, B. D., "Introduction to Magnetic Materials", Addison-Wesley Publishing Co., Reading, Mass., 1972, pp. 244-246), and it is known for competing perpendicular uniaxial anisotropies that the magnetization vector M will tend to lie along the easy axis with the stronger anisotropy field. In the embodiment of the present invention, it is desired that in the absence of signal or bias fields M tend to lie along the major axis of the MR element, i.e. in the direction of the shape anisotropy, and this may be insured by proper selection of the dimensions of the MR permalloy element. An approximate formula for the magnitude of the shape anisotropy field is given by Jeffers et al., "Soft-Adjacent-Layer Self Biased Magnetoresistive Heads in High Density Recording", IEEE Transactions on Magnetics, Vol. MAG-21, No. 5, September 1985, pp. 1563-1564; $Hd = (4\pi Ms) \times (t/h)$, where Hd is the magnitude of the shape anisotropy field in oersteds in the direction of the major axis of the MR element, Ms is the saturation magnetization of the MR element material, t is the thickness of the MR element, and h is the height of the MR (as well as the SAL) element. For a permalloy film, the value of $4\pi Ms$ is approximately $10^4$ gauss. In the present embodiment of the invention, a permalloy MR element with a minor axis dimension of 20 microns, a film thickness of 500 angstroms, with an induced anisotropy field of permalloy of about 5 oersteds, will have a shape anisotropy field of approximately 25 oersteds. Because the shape anisotropy field of 25 oersteds is considerably larger than the induced anisotropy field of 5 oersteds, the unbiased magnetization vector M will tend to lie along the major axis of the MR element, and its direction will not be influenced by the induced easy axis lying in the direction of the minor geometric axis.

With the magnetization field lying in the direction of the major axis of the MR element 24', a vertical bias field H"b 18" will rotate the magnetization vector M 60' through the angle 62' as previously described in connection with FIG. 2. The establishment of the bias field, however, is now accomplished with a significant reduction of the sense current I""s 23"" because the induced easy axes H'k of both the MR element and the SAL element coincide with the direction of the bias field H"b 18". Attendantly, the sense current amplitude reduction is accompanied by a decrease in power dissipation and injurious heating of the MR element.

The invention has been described in detail with particular reference to preferred embodiments thereof, but it will be understood that variations and modifications can be effected within the spirit and scope of the invention.

What is claimed is:

1. A magnetic head comprising:
    a. a first thin magnetic film disposed to coact with a signal pre-recorded on a magnetic recording medium, said first thin magnetic film having major and minor mutually orthogonal geometric axes, wherein the shape anisotropy easy axis of said first thin magnetic film lies along said major geometric axis of said first thin magnetic film, and the induced anisotropy easy axis of said first thin magnetic film lies along said minor geometric axis of said first thin magnetic film,
    b. a second thin magnetic film having major and minor mutually orthogonal geometric axes, said second thin magnetic film located adjacent to said first thin magnetic film, wherein the shape anisotropy easy axis of said second thin magnetic film lies along said major geometric axis of said second thin magnetic film, and the induced anisotropy easy axis of said second thin magnetic film lies along said minor axis of said second thin magnetic film,
    c. means for magnetically coupling said first and said second thin films,
    d. current means coupled to said first thin magnetic film for generating a magnetizing field having a component parallel to said induced easy axis of said second thin magnetic film, and
    e. means cooperative between said magnetizing field and said second thin magnetic film for producing a magnetic bias field at said first thin magnetic film, wherein said bias field at said first thin magnetic film lies in the direction of said induced anisotropy easy axis of said first thin magnetic film, and wherein said bias field at said second thin magnetic film lies in the direction of said induced anisotropy easy axis of said second thin magnetic film, whereby the magnitude of said current means necessary to produce said bias field is diminished.

2. The magnetic head of claim 1 wherein the shape anisotropy field lying along said major axis of said first thin magnetic film is greater than the induced anisotropy field of said first thin magnetic film.

3. The magnetic head of claim 1 wherein said first thin magnetic film and said second thin magnetic film are permalloy films.

4. A magnetic head comprising:
    a. a planar magnetoresistive element having a minor geometric axis and having an induced easy axis in the direction of said minor geometric axis of said magnetoresistive element,
    b. means associated with said magnetoresistive element for generating a magnetizing field parallel to said induced easy axis of said magnetoresistive element,
    c. a planar soft magnetic layer having a minor geometric axis, said soft magnetic layer being magnetically coupled to said magnetoresistive element, and said soft magnetic layer having an induced easy axis along said minor geometric axis of said soft magnetic layer, said induced easy axis along said minor geometric axis of said soft magnetic layer being parallel to said magnetizing field, and d. means for magnetically coupling said magnetizing field and said soft magnetic layer, wherein a magnetic field in the direction of said induced easy axis of said magnetoresistive element is induced by said soft magnetic layer for biasing the magnetization of said magnetoresistive element, whereby the effectiveness of said means associated with said magnetoresistive element results in a reduction of the required biasing current.

* * * * *